United States Patent Office 2,862,906
Patented Dec. 2, 1958

1

2,862,906

SUSPENSION PROCESS FOR THE POLYMERIZATION OF VINYLIDENE AROMATIC HYDROCARBONS

Alvin Stein and Robert L. Walter, Springfield, Mass., assignors to Monsanto Chemical Company, St. Louis, Mo., a corporation of Delaware No Drawing. Application April 1, 1957
Serial No. 649,595

9 Claims. (Cl. 260—45.5)

The present invention relates to an improved process for polymerizing vinylidene aromatic hydrocarbon and ring-halogenated vinylidene aromatic hydrocarbon monomers by a suspension polymerization process.

The co-pending application of John B. Ott, Serial No. 573,074, filed on March 22, 1956, discloses a process for the suspension polymerization of vinylidene aromatic hydrocarbons and ring-halogenated vinylidene aromatic hydrocarbons in which certain water-soluble interpolymers of 93.5–98.5 mol percent of an acidic monomer of the group consisting of acrylic acid, methacrylic acid and mixtures thereof, and, correspondingly, 6.5–1.5 mol percent of a monomer of the group consisting of 2-ethylhexyl acrylate, 2-ethylhexyl methacrylate, and mixtures thereof are employed as the suspending agent.

In continuing studies of the suspension polymerization of vinylidene aromatic hydrocarbons and ring-halogenated vinylidene aromatic hydrocarbons, we have discovered that substantially improved results can be obtained by dispersing and polymerizing a vinylidene aromatic hydrocarbon or a ring-halogenated vinylidene aromatic hydrocarbon in an aqueous medium containing as the dispersing agent a binary mixture of (1) a water-soluble interpolymer of 93.5–98.5 mol percent of an acidic monomer of the group consisting of acrylic acid, methacrylic acid, and mixtures thereof, and, correspondingly, 6.5–1.5 mol percent of a monomer of the group consisting of 2-ethylhexyl acrylate, 2-ethylhexyl methacrylate and mixtures thereof, and (2) a bis(sulfoaryl) alkane. In particular, the process of this invention is highly efficient in that (a) low water monomer ratios may be employed, (b) the percentage of polymer emulsified is low, (c) the polymer particles are unusually homogeneous and have a very narrow range of particle size distribution and (d) the polymer obtained does not discolor when injection molded at high temperatures, e. g., above 500° F.

The following examples are set forth to illustrate more clearly the principle and practice of this invention to those skilled in the art. Where parts are mentioned, they are parts by weight.

*Example I*

Six parts of a rubbery interpolymer containing 75% butadiene and 25% styrene are dissolved in 94 parts of styrene monomer together with 0.05 part of ditertiary butyl peroxide, 0.3 part of an anti-oxidant, 0.1 part of a commercial $C_{12}$ mercaptan modifier and 2.0 parts of a refined hydrocarbon oil lubricant. After sweeping the reaction atmosphere free of oxygen with nitrogen, the reaction mixture is agitated and heated en masse until 28% of the styrene monomer has been polymerized. There is then charged to the reaction vessel 200 parts of water having dissolved therein 0.25 part of the sodium salt of bis(sulfonaphthyl) methan, 0.15 part of calcium chloride and 0.25 part of an interpolymer of 95.5 mol percent acrylic acid and 4.5 mol percent 2-ethylhexyl

2 acrylate which has a specific viscosity of about 4.0 as determined in a 1% solution in water at 25° C. Thereafter, the reaction mixture is put under nitrogen pressure and agitated and heated for 3 hours at 130° C. and 5 hours at 140° C. The polymer is obtained in the form of homogeneous small spherical beads having a narrow distribution of particle sizes. The yield is substantially quantitative as only about 1% of the polymer is emulsified and lost in the filtration step. The polymer does not discolor when injection molded at 500° F.

*Comparative Example I*

Example I is repeated except that the sodium salt of bis(sulfonaphthyl) methane is omitted from the aqueous phase and the concentration of the acrylic acid-2-ethylhexyl acrylate interpolymer is increased to 0.3 part. The product obtained, although of an acceptable fine particle size, is not as homogeneous as the product obtained in Example I and has a much wider distribution of particle sizes. Moreover, the polymer particles obtained in this example tend to be of irregular shapes, whereas the polymer particles obtained in Example I are almost all spherical. The overall yield is approximately 97%, with 3% of the polymer being emulsified and lost in the filtration step. The polymer discolors somewhat when injection molded at 500° F.

*Example II*

The styrene monomer-rubbery butadiene-styrene interpolymer solution described in Example I is agitated and heated en masse until 33% of the styrene monomer is polymerized. There is then added to the reaction system 120 parts of water having dissolved therein 0.13 part of the acrylic acid-2-ethylhexyl acrylate interpolymer described in Example I, 0.3 part of the sodium salt of bis(sulfonaphthyl) methane and 0.1 part of calcium chloride. The polymerization is completed by agitating and heating the reaction mixture under nitrogen pressure for 3 hours at 130° C. and 5 hours at 140° C. The polymer is obtained in substantially quantitative yield with essentially no polymer being lost through emulsion formation. The properties of the polymer correspond in all essential respects to those of the product obtained in Example I.

*Example III*

Example II is repeated except that the material polymerized comprises 20 parts of the rubbery butadiene-styrene interpolymer described in Example I dissolved in 80 parts of styrene monomer. Essentially comparable results are obtained.

*Example IV*

Example II is repeated except that the quantity of water employed is reduced to 80 parts. Essentially comparable results are obtained.

*Example V*

Example II is repeated except that the material polymerized comprises 6 parts of the butadiene-styrene interpolymer described in Example I dissolved in 66 parts of styrene monomer and 28 parts of acrylonitrile monomer. Comparable results are obtained.

*Example VI*

A solution of 6 parts of an interpolymer of 75% butadiene and 25% styrene dissolved in 84 parts of styrene monomer and 10 parts of alpha methylstyrene monomer, said solution also containing 0.05% of ditertiary butyl peroxide, 0.3% of an anti-oxidant, 0.1% of a commercial $C_{12}$ mercaptan modifier and 2.0% of a refined hydrocarbon oil lubricant, is agitated and heated en masse until approximately 40% of the monomeric components thereof are polymerized. To this solution there is added 120 parts of water having dissolved therein 0.13 part of the acrylic acid-2-ethylhexyl acrylate interpolymer described in Example I, 0.3 part of the sodium salt of bis(sulfonaphthyl) methane and 0.1 part of calcium chloride. The polymerization is completed by agitating and heating the mixture under nitrogen pressure for 4 hours at 130° C. and 9 hours at 135° C. The product is obtained in the form of small homogeneous essentially spherical particles with essentially none of the polymer being lost through emulsion formation.

*Examples VII–VIIII*

Examples II, V, and VI are repeated except that the rubbery butadiene-styrene interpolymer is omitted from the monomer solution. Essentially comparable results are obtained.

One component of the binary dispersing agent system employed in the process of the present invention is a water-soluble interpolymer of an acidic monomer of the group consisting of acrylic acid, methacrylic acid and mixtures thereof and a monomer of the group consisting of 2-ethylhexyl acrylate, 2-ethylhexyl methacrylate and mixtures thereof. For the purposes of this invention, such interpolymers are considered to be water soluble if 0.5 part of the interpolymer will dissolve in 99.5 parts of water at 25° C. Such interpolymers should contain 1.5–6.5 mol percent and preferably 2.0–5.0 mol percent of the 2-ethylhexyl ester with the balance of the interpolymer being the acidic monomer. For reasons of both cost and performance, it is preferred to employ interpolymers of acrylic acid and 2-ethylhexyl acrylate.

The dispersing action of the water-soluble interpolymers is affected but slightly by wide variations in molecular weight. The preferred dispersing agents, however, have specific viscosities of at least 0.1 when methacrylic acid is the acidic monomer included in the interpolymer and at least about 0.8 when acrylic acid is the acidic monomer included in the interpolymer. Both of the above specific viscosity values are determined in 1% solutions in water at 25° C. in accordance with the well-known formula:

$$\text{Specific viscosity} = \frac{\text{Solution viscosity} - \text{solvent viscosity}}{\text{Solvent viscosity}}$$

Methods for preparing such water-soluble dispersing agents are described in detail in the co-pending application of John B. Ott, Serial No. 573,069, filed March 22, 1956, and that description is incorporated herein by reference. The preferred process for synthesizing the water-soluble dispersing agents comprises dissolving an appropriate monomer mixture and a free radical generating polymerization initiator in an organic liquid which is a solvent for the monomer mixture but a non-solvent for the interpolymer prepared therefrom and heating to effect polymerization.

The second component of the binary dispersing agent system employed in the process of the present invention is a bis(sulfoaryl)alkane. Such bis(sulfoaryl) alkanes may be employed either in the form of the free acid or preferably as a water-soluble salt such as an alkali metal, ammonium or amine salt. Typical examples of such bis(sulfoaryl) alkanes include bis(sulfophenyl) methane, bis(sulfotolyl) methane, bis(sulfonaphthyl) methane, 1,1-bis(sulfophenyl) ethane, 2,2-bis(sulfonaphthyl) propane, etc. The bis(sulfoaryl) alkanes need not be specially purified and the normal commercial grades of such products may be employed. Commercial grades of the alkali metal salts of the bis(sulfoaryl) alkanes frequently contain relatively large quantities of inorganic salts such as sodium sulfate, but the presence of such inorganic salts has no noticeable deleterious effect upon the process. The bis(sulfoaryl) alkanes employed in the present invention normally will be prepared by condensing aryl sulphonic acids with an aldehyde such as formaldehyde.

Usually it is necessary to employ only a small concentration of the dispersing agents of this invention, e. g., 0.02–1.0% and more preferably, 0.05–0.5% of each of the dispersing agents, such percentages being expressed on the basis of the weight of monomer employed. The amount of each of the dispersing agents to be employed in any particular polymerization depends upon a number of factors such as the particular vinylidene aromatic hydrocarbon monomer being polymerized, the water/monomer ratio, etc., and by controlling the concentration of the dispersing agents under a given set of polymerization conditions it is possible to obtain the vinylidene aromatic hydrocarbon polymer in a controlled, desired particle size with a minimum formation of polymer emulsion. In general, it is preferred to employ the smallest quantities of the dispersing agents that will produce polymers of the desired particle size.

The ratio of water to monomer that may be employed in the present invention is considerably lower than the corresponding ratios obtainable with many prior art processes. Polymerizations have been run on a routine basis with a minimum of difficulty employing a water/monomer ratio of 0.8/1. Even lower water/monomer ratios may be employed, but such polymerizations, in general, require relatively close control of the various reaction parameters such as reaction temperature, ratios and concentrations of the two dispersing agents, the degree of agitation, etc. It is possible, of course, to run the polymerizations at higher water/monomer ratios, but for economic reasons it is usually desirable to operate at relatively low water/monomer ratios.

In carrying out the polymerizations, it is usually preferred to maintain the pH of the aqueous dispersing medium below about 7.0. The water-soluble interpolymer dispersing agent contains carboxyl groups and, when employed at the preferred levels, will lower the pH of the aqueous dispersing medium to the approximate range of 3.0–4.0 which is close to the optimum pH. It is also desirable to include small quantities of inorganic salts in the aqueous dispersing medium to assist in minimizing the formation of polymer emulsion during the polymerizations.

The polymerizations may be carried out by charging the monomer, polymerization initiator, water and dispersing agents to the system initially and heating and stirring the reaction mixture. In one embodiment of the invention, however, the water, monomer and polymerization initiator are charged to the reaction vessel and the addition of the dispersing agents is delayed until the monomer has been polymerized to a conversion of the order of 20–30%. In still another embodiment of the invention, the monomers may be polymerized to a conversion of 20–30% before they are charged to the reaction vessel containing the water and dispersing agents.

The polymerization initiators employed are normally free-radical generating initiators such as benzoyl peroxide, lauroyl peroxide, ditertiary butyl peroxide, oleyl peroxide, toluyl peroxide, phenyl azo triphenyl methane, and the like. Additional substances that may be incorporated in the monomer prior to or during the polymerization include polymerization modifiers, plasticizers, lubricants, antioxidants, stabilizers, colorants, etc.

The process of the present invention may be employed in the homopolymerization of a vinylidene monomer of the group consisting of vinylidene aromatic hydrocarbon monomers, ring-halogenated vinylidene aromatic hydrocarbon monomers and mixtures thereof or the interpolymerization of such monomers with themselves or other interpolymerizable vinylidene monomers. Examples of vinylidene aromatic hydrocarbon and ring-halogenated vinylidene aromatic hydrocarbon monomers that may be homopolymerized or interpolymerized by the method of this invention include styrene; vinyl naphthalene; alpha-alkyl vinylidene aromatic hydrocarbons, e. g., alpha-methylstyrene, alpha-ethylstyrene, alpha-methyl vinyl toluene, alpha-methyl dialkylstyrenes, etc.; ring-substituted alkylstyrenes, e. g., vinyl toluene, o-ethylstyrene, p-ethylstyrene, 2,4-dimethylstyrene, etc.; ring-substituted halostyrenes, e. g., o-chlorostyrene, p-chlorostyrene, o-bromostyrene, 2,4-dichlorostyrene, etc.; ring-substituted alkyl, ring-substituted halostyrenes, e. g., 2-chloro-4-methylstyrene, 2,6-dichloro-4-methylstyrene, etc. Examples of the vinylidene monomers that may be interpolymerized with the vinylidene aromatic hydrocarbon and ring-halogenated vinylidene aromatic hydrocarbon monomers include the conjugated 1,3-dienes, e. g., butadiene, isoprene, etc.; alpha, beta-unsaturated monobasic acids and derivatives thereof, e. g., acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, etc. Preferably, in the case of interpolymerizations, a predominant proportion, i. e., more than 50% by weight, of the mixture of monomers is a vinylidene aromatic hydrocarbon and especially styrene.

This invention is particularly adapted to the suspension polymerization of high impact materials wherein a rubbery conjugated 1,3-diene polymer is dissolved in a vinylidene aromatic hydrocarbon or a ring-halogenated vinylidene aromatic hydrocarbon monomer and the monomer is subsequently polymerized. The materials thus polymerized will comprise a solution of a rubbery conjugated 1,3-diene polymer in a vinylidene aromatic hydrocarbon or a ring-halogenated vinylidene aromatic hydrocarbon monomer or a monomer mixture consisting predominantly of the vinylidene aromatic hydrocarbon monomer or the ring-halogenated vinylidene aromatic hydrocarbon monore. Such polymerizable mixtures will usually contain from 1% to about 25 weight percent of the rubbery conjugated 1,3-diene polymer with the balance of the mixture being substantially monomeric components. The rubbery conjugated 1,3-diene polymer component of the polymerizable mixtures may be essentially any such polymer having a brittle temperature of 0° C. or less, said brittle temperature being determined by ASTM Test Procedure D746–52T. Typical examples of such rubbery polymers include natural rubber itself, synthetic polyisoprene, polybutadiene, interpolymers of butadiene and/or isoprene with styrene, acrylonitrile, acrylate esters, etc. In the preparation of such high impact material, it is preferred to polymerize at least 15% of the monomeric constituents of the solution of the rubbery conjugated 1,3 diene polymer in the vinylidene aromatic hydrocarbon or a ring-halogenated vinylidene aromatic hydrocarbon monomer before the monomer solution is contacted with the aqueous solution containing the dispersing agents.

The above descriptions and particularly the examples are set forth by way of illustration only. Many other variations and modifications thereof will be apparent to those skilled in the art and can be made without departing from the spirit and scope of the invention herein described.

What is claimed is:

1. In a process for preparing polymerization products in granular form, the step which comprises polymerizing an aqueous dispersion of a polymerizable material containing a vinylidene monomer of the group consisting of vinylidene aromatic hydrocarbon monomer, a ring-halogenated vinylidene aromatic hydrocarbon monomer and mixtures thereof in the presence of, as a dispersing agent, a mixture of (1) a water-soluble interpolymer consisting of 93.5–98.5 mol percent of an acidic monomer of the group consisting of acrylic acid, methacrylic acid, and mixtures thereof, and, correspondingly, 6.5–1.5 mol percent of a monomer of the group consisting of 2-ethylhexyl acrylate, 2-ethylhexyl methacrylate and mixtures thereof, and (2) a material from the group consisting of bis(sulfoaryl) alkanes and water soluble salts thereof.

2. The process of claim 1 in which the water-soluble interpolymer is an interpolymer of acrylic acid and 2-ethylhexyl acrylate.

3. The process for preparing styrene-containing polymers in granular form which comprises polymerizing an aqueous dispersion containing styrene monomer in the presence of, as a dispersing agent, a mixture of (1) a water-soluble interpolymer consisting of 93.5–98.5 mol percent of acrylic acid and, correspondingly, 6.5–1.5 mol percent of 2-ethylhexyl acrylate and (2) a water-soluble salt of bis(sulfonaphthyl) methane.

4. The process of claim 3 in which the styrene monomer is interpolymerized with acrylonitrile.

5. The process of claim 4 in which a rubbery conjugated 1,3-diene polymer is dissolved in the mixture of styrene monomer and acrylonitrile monomer before the polymerization thereof.

6. The process of claim 3 in which the styrene monomer is interpolymerized with alpha-methylstyrene.

7. The process of claim 6 in which a rubbery conjugated 1,3-diene polymer is dissolved in the mixture of styrene monomer and alpha-methylstyrene monomer before the polymerization thereof.

8. The process of claim 3 in which a rubbery conjugated 1,3-diene polymer is dissolved in the styrene monomer before the polymerization thereof.

9. The process of claim 8 in which at least 15% of the monomeric constituents of the solution of the rubbery conjugated 1,3-diene polymer in the styrene monomer are polymerized before the partially polymerized mixture is contacted with an aqueous solution containing the dispersing agents.

References Cited in the file of this patent

UNITED STATES PATENTS 2,535,189   Benson et al. _____ Dec. 26, 1950